No. 672,192. Patented Apr. 16, 1901.
G. MacDONALD.
MANUFACTURE OF MATERIAL FOR FILTERING.
(Application filed Dec. 24, 1897.)
(No Model.)
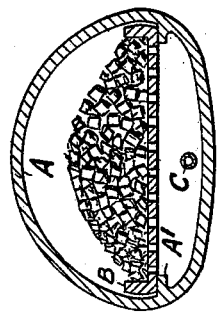
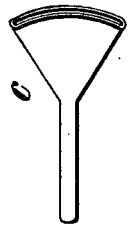
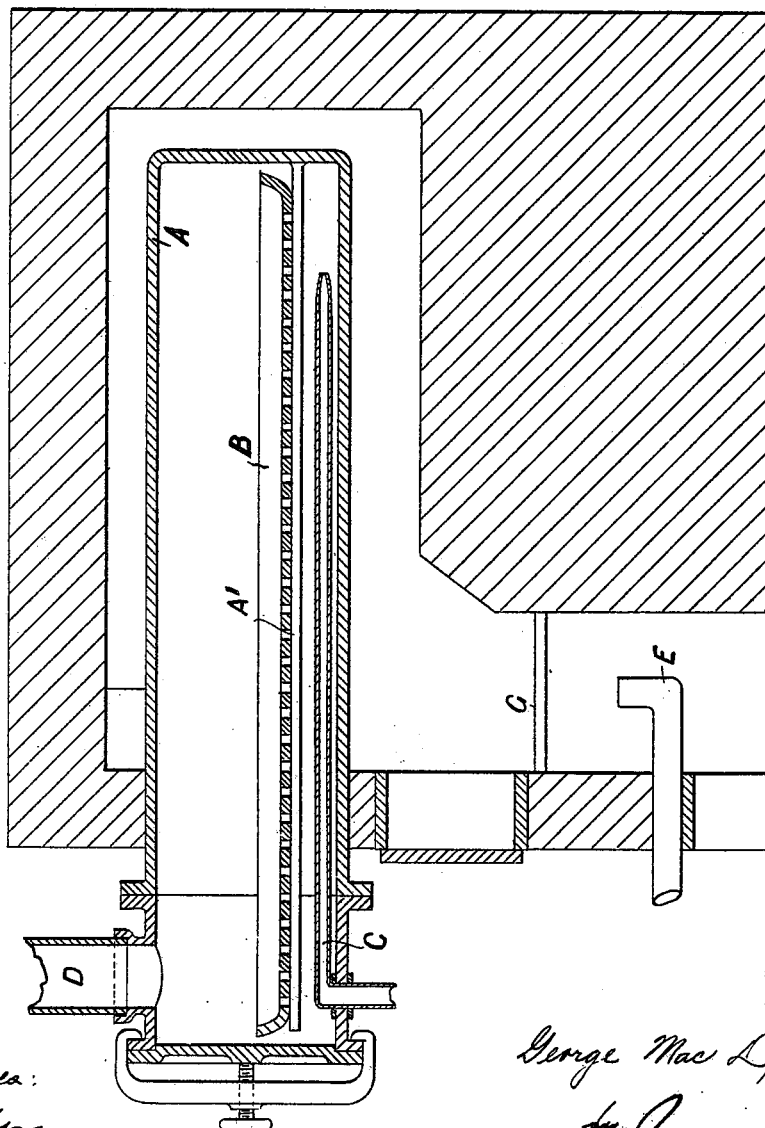

UNITED STATES PATENT OFFICE.

GEORGE MacDONALD, OF LONDON, ENGLAND, ASSIGNOR OF TWO-THIRDS TO FREDERICK EDWARD BRISTOWE, OF SAME PLACE, AND WILLIAM ROBERT RENSHAW, OF STOKE-UPON-TRENT, STAFFORDSHIRE, ENGLAND.

MANUFACTURE OF MATERIAL FOR FILTERING.

SPECIFICATION forming part of Letters Patent No. 672,192, dated April 16, 1901.

Application filed December 24, 1897. Serial No. 663,390. (No specimens.)

*To all whom it may concern:*

Be it known that I, GEORGE MACDONALD, a subject of the Queen of Great Britain and Ireland, residing at London, England, have invented certain new and useful improvements in and connected with the manufacture of material for filtering water, sewage effluents, saccharine juices, alcoholic liquors, illuminating-gas, and other liquids and fluids, (for which I have obtained patents in the following countries, viz: Great Britain, No. 19,952, bearing date October 23, 1895; France, No. 256,881, bearing date June 2, 1896, and Belgium, No. 121,694, bearing date June 2, 1896,) of which the following is a specification.

The object of this invention is to produce in a cheap, convenient, and expeditious manner from certain iron ores a material applicable to the filtering or purifying of water, sewage effluents, saccharine juices, alcoholic liquors and other liquids, and of illuminating-gas, sewer-gas, air, and other gases, to the depriving of chalybeate water of its iron and peaty water and other liquids of their color, also for depriving sulfureted and phosphoreted hydrogen of their smell.

The material employed is iron ore in the form of ferric-oxid pyrites, amorphous chlorite, and other materials capable of being reduced in the manner described into porous, solid, or pulverulent magnetic oxid of iron. Iron ore containing protoxid of iron (FeO) or ferrous oxid may also be utilized if it has first been roasted, so as to convert it into ferric oxid, ($Fe_2O_3$.)

The material to be treated, reduced to small pieces about one-fourth or one-half inch in diameter, is placed in horizontal retorts provided with perforated shelves, trays, or gratings.

In the accompanying drawings, Figure 1 is a longitudinal vertical section of an apparatus designed for the production of the filtering material referred to; and Fig. 2 is a cross-section of the retort, Fig. 3 showing the hydrocarbon-discharge nozzle in perspective.

A retort A is arranged in a suitable heating-chamber and provided internally with ledges A' for a perforated false bottom, tray, or grate B, on which the material to be treated is piled, such material being charged onto the perforated support through the outer end of said retort, which is closed fluid-tight by a suitable cover in a well-known manner. Below the perforated support B for the material to be treated is arranged a spray-pipe C, which extends nearly to the inner end of the retort, said pipe terminating, preferably, in a flat nozzle c, Fig. 3, and is designed to supply the retort with the necessary amount of hydrocarbon forced through said pipe under such pressure as to eject the hydrocarbon in the form of a thin sheet, so as to be rapidly vaporized, the gases escaping from the retort at the forward end thereof through a pipe D above the perforated false bottom. Below the retort A is arranged a grate G, and in practice I prefer to heat the retort by means of a combustible liquid injected into the furnace below the grate, which may be charged with a combustible absorbent or porous material, as coke, or with an incombustible porous material, as asbestos. The retort is heated to a red heat, or to about 900° Fahrenheit, and kept at this temperature until the iron oxid therein is sufficiently reduced by the hydrocarbon vapors passing through the same—that is to say, until the oxid is converted into a magnetic oxid ($Fe_3O_4$) which is non-crystalline and of a full black color and contains a proportion of oxygen between that of ferrous and ferric oxid.

In practice I find that about fifteen gallons of common petroleum residue will suffice for the reduction of one ton of hematite ore.

The time required for converting the oxid of iron into a magnetic oxid naturally depends upon the capacity of the retort, and when the conversion is completed, which with a retort of the capacity of those used in gas-works takes place in about three or four hours, the material is transferred to a receiver adapted to be closed and allowed to cool therein.

As an example I have shown an apparatus having but a single horizontally-arranged retort. It will, however, be readily understood that in the production of the filtering medium on a commercial scale any suitable or convenient number of retorts may be grouped together or arranged in a setting, as is commonly done in the arts, while said retorts need not necessarily be horizontal, as they may be vertical or inclined, which is also a common practice.

Having thus described my invention, what I claim as new therein, and desire to secure by Letters Patent, is—

The process, which consists in heating ferric oxid to a red heat within an externally-heated space and while spread out in a comparatively thin layer over a comparatively large area, injecting and spraying liquid petroleum residue in predetermined proportions, relatively to the mass of ferric oxid, into said space at one end thereof below the oxid to convert said residue into a reducing-gas, and drawing said gas off at the opposite end of said space above the layer of oxid, whereby the latter is subjected to the action of the reducing-gas so produced and converted into a homogeneous non-crystalline ferroso-ferric oxid ($Fe_3O_4$) substantially as and for the purposes set forth.

GEORGE MacDONALD.

Witnesses:
E. D. ECAILLE,
W. M. HARRIS.